United States Patent
Blasco Claret et al.

(10) Patent No.: US 8,686,597 B2
(45) Date of Patent: Apr. 1, 2014

(54) DEVICE FOR VOLTAGE MULTI-INJECTION ON MULTIPLE CONDUCTORS

(75) Inventors: Jorge Vicente Blasco Claret, Valencia (ES); José Luis González Moreno, Xirivella (ES); José María Vidal Ros, Valencia (ES)

(73) Assignee: Marvell Hispania, S.L.U., Madrid (ES)

( * ) Notice: Subject to any disclaimer, the term of this patent is extended or adjusted under 35 U.S.C. 154(b) by 912 days.

(21) Appl. No.: 12/681,506

(22) PCT Filed: Sep. 26, 2008

(86) PCT No.: PCT/ES2008/000611
§ 371 (c)(1),
(2), (4) Date: Jun. 24, 2010

(87) PCT Pub. No.: WO2009/043951
PCT Pub. Date: Apr. 9, 2009

(65) Prior Publication Data
US 2010/0264886 A1    Oct. 21, 2010

(30) Foreign Application Priority Data
Oct. 3, 2007   (ES) .................................. 200702596

(51) Int. Cl.
*H02J 3/24*     (2006.01)
(52) U.S. Cl.
USPC ......................................................... 307/102
(58) Field of Classification Search
USPC ......................................................... 307/102
See application file for complete search history.

(56) References Cited

U.S. PATENT DOCUMENTS

| | | | |
|---|---|---|---|
| 7,026,952 B2 * | 4/2006 | Krueger ..................... | 340/855.3 |
| 7,099,678 B2 * | 8/2006 | Vaidyanathan ............... | 455/500 |
| 2002/0027760 A1 * | 3/2002 | Anthony ....................... | 361/127 |
| 2002/0186777 A1 * | 12/2002 | Perino et al. .................. | 375/257 |
| 2005/0238107 A1 | 10/2005 | Yamashita et al. | |
| 2007/0268989 A1 | 11/2007 | Schwager et al. | |
| 2008/0137759 A1 * | 6/2008 | Cai et al. ....................... | 375/257 |

FOREIGN PATENT DOCUMENTS

| | | |
|---|---|---|
| EP | 2207272 | 7/2010 |
| WO | WO2005/101684 | 10/2005 |

OTHER PUBLICATIONS

PCT International Preliminary Report on Patentability for related application PCT/ES2008/000611; Apr. 2010; 5 pages.
Pang, T.S.; Common-Mode Current Propagation in Power Line Communication Networks Using Multi-Conductor Transmission Line Theory; 2007; 6 pages.

(Continued)

*Primary Examiner* — Jared Fureman
*Assistant Examiner* — Duc M Pham

(57) ABSTRACT

A device is configured to inject signals onto a medium made up of conductors and a reference plane. Transformers inject the signals onto the conductors by orthogonal modes. Differential mode chokes each include one input and two outputs. The input is connected to one end of a secondary winding of one of the transformers, or one of the outputs of another one of the chokes. The two outputs are connected to either the inputs of two others of the chokes, the input of another one of the chokes and a conditioner of one of the conductors, or conditioners of two of the conductors. The number of chokes depends on a number of non-differential modes used. The injections that use the chokes are injections selected from between pseudo-differential injections, injection in common mode, or a combination of pseudo-differential injections and injection in common mode.

7 Claims, 5 Drawing Sheets

(56) References Cited

OTHER PUBLICATIONS

Pang, T.S.; Modeling and Analysis of Common-Mode Current Propogation in Broadband Power-Line Communication Networks; 2007; 9 pages.

Chinese Office Action for related application 200880118810.X; Sep. 27, 2012; 6 pages.

\* cited by examiner

DEVICE FOR VOLTAGE MULTI-INJECTION ON MULTIPLE CONDUCTORS

OBJECT OF THE INVENTION

As stated in the title of this descriptive specification, the following invention relates to a device for voltage multi-injection on multiple conductors. In any communications system one aims to exploit as much as possible the characteristics of the communications medium in order to achieve the maximum transmission capacity, reliability, coverage, etc. In the case of the communications medium being made up of multiple conductors it is possible to use those conductors in order to achieve one or several of these objectives. There exist methods in the state of the art both for enhancing the quality of the communication and for increasing the reutilization of frequencies, among other applications, but they need the signals to be injected properly in order to be able to do this.

The present invention reveals a device specially designed for performing voltage multi-injection on multiple conductors such that it becomes easier to implement methods for increasing the quality of the communications.

PRIOR ART OF THE INVENTION

Communications systems need a transmission medium for the signals, which is very often made up of multiple conductors. The presence of these multiple conductors can be exploited in order to enhance various features of the communications system, such as the transmission capacity or immunity to noise, among others. One of the ways of exploiting the multi-conductor medium is to use orthogonal modes, for which it is necessary to inject signals in that medium in the right way.

The device of the invention is designed for being able to apply the method specified in Spanish patent with application number 200702256 relating to a "Method for increasing the performance of a communications system on a medium made up of multiple conductors". As with this patent, the description of the inventive device uses various conventional concepts which are commented on below. "Mode" is understood to be the injection of voltage or current on a selective combination of conductors, reference plane or both. Likewise, "orthogonal multi-injection" is defined as being an injection of multiple modes orthogonal to each other. The injection modes are divided into common mode, differential modes and pseudo-differential modes. The common mode is that which causes circulation of currents via the reference plane. The differential modes consist of injection by a conductor and collection of the return via the other, while pseudo-differential modes consist of injection of voltage or current between one or more conductors and return via one or more conductors different from those used for the injection, the number of conductors used in this case being greater than two.

There exists in the state of the art some patents with methods intended to increase the performance of a communications system when the medium is a multi-conductor which leave unsolved the problem of carrying out the injection in that medium. The inventive device solves this shortcoming and focuses on the specific way of carrying out voltage injection on that medium in order to achieve orthogonality among the injections; it therefore solves the stated problem and as a consequence it is not anticipated by the documents existing in the state of the art.

Moreover, the state of the art also contains patents on capacitative couplers, but which do not anticipate the present invention. One of these patents is that known as "Capacitative coupling device for data transmission equipment to a phase of an electrical power line", with European application number E05773887. This patent describes a method of capacitative coupling conceived for medium voltage lines where the safety measures are very strict. The coupling needs a ground connection and it also couples the signal in "single-ended" mode, in other words, it injects the signal in a single phase with respect to ground. This does not take away any novelty or inventive level from the inventive device, since the latter is capable of injecting in differential or pseudo-differential modes or in common mode, carrying out multi-injections of signals on several conductors, including or not the reference plane normally connected to ground.

Another document of the state of the art is the Spanish patent relating to a "Medium voltage equipment with capacitative coupling system", with publication number 2204334A1. As with the previous reference, it describes a method of medium voltage capacitative coupling in order to couple the signal to a phase of the medium voltage network. This does not affect the novelty or inventive level of the present patent, since it cannot be used for multiple injections in a multi-conductor medium with reference plane, where the injections are differential, pseudo-differential or common mode.

Moreover, the patent known as "Powerline carrier control installation" with number U.S. Pat. No. 4,383,243 describes how to couple a signal from a single control tone on the electric line by means of a capacitative coupling. The circuit of this patent improves the adaptation to the impedance of the medium but it cannot be used for multi-injection and so it does not take away any novelty or inventive level from the inventive device.

The document "Coupling device for low-rate carrier current transmission system", with number U.S. Pat. No. 6,693,803B2, reveals a method of coupling for carrying out transmissions/receptions of modulations of a single carrier. The coupling is carried out by means of a transformer and a coupling capacitor, being a differential injection made between phase and neutral. This circuit cannot be used for carrying out orthogonal multi-injections in multiple conductors, and it therefore does not anticipate the present invention.

Finally, another example of a capacitative coupler of the state of the art is that specified in patent "Medium voltage signal coupling structure for last power grip high-speed data network", with publication number US 2004/0056734-A9, which describes a coupler for medium voltage aerial lines placing the emphasis on the safety mechanisms necessary for the handling of this type of line. As occurred in the previous references, this coupler does not anticipate the multi-injection device of the present invention.

DESCRIPTION OF THE INVENTION

In order to achieve the objectives and avoid the drawbacks stated in previous sections, the invention consists of a device for voltage multi-injection on multiple conductors which permits the application of methods for increasing the performance of a communications system on a medium made up of N conductors and a reference plane. Said device is made up of the following elements and connections: E signal inputs, where E is between 1 and N, for each one of the signals to inject between the conductors; E signal transformers which receive the E signal inputs in order to inject them by means of orthogonal modes between the different conductors; and C differential mode chokes, where C lies between 0 and E depending on the number of non-differential modes injected in the E inputs. Thanks to this configuration of the device it is possible to inject communication signals in up to N combinations of the conductors, including injection in common mode, in such a way that said injected signals are orthogonal to each other.

Moreover, the device can also include A conditioners, where A is between E+1 and N, depending on the number of conductors used, which are located between the conductors and selectively between one of the ends of the secondary winding of the transformers, one of the outputs of the differential mode choke, and both.

In this device the transformers, which have an input winding and an output winding, connect their input winding to the E signal inputs and they connect the ends of their output winding selectively to two conditioners, to one conditioner and a differential mode choke, to two differential mode chokes, or to the reference plane and a differential mode choke.

In general, the differential mode chokes have one input and two outputs. These differential mode chokes connect their input to an element selected from between the ends of the secondary windings of one of the E transformers and one of the outputs of the other differential choke; and they connect their outputs to an element selected from between the input of two different differential chokes, the input of a differential choke and a conditioner of a conductor, and to the input of the signal conditioners of two different conductors; where the injections that use these differential chokes are those known as pseudo-differential injections, injection in common mode or both.

Moreover, if it is wished to permit the co-existence of multi-injected signals with other signals present in the communication medium, the conditioners will be filters.

A specific embodiment of these filters would be to use capacitors as conditioners, which would act as high pass filters towards signals from the communications channel.

The differential mode chokes can be implemented by exploiting the existence of transformers in the device. In this case, one or more of the differential mode chokes are implemented including them in one or more of the E input transformers respectively; such that for each differential mode choke implemented in this way, its input will be the intermediate connection of the secondary winding of the transformer and its outputs will be the ends of the secondary winding.

Finally, although the inventive device can be used in any multi-conductor medium, it is specifically developed for the case in which the communications channel made up of multiple conductors is the electrical network.

Below, in order to facilitate a better understanding of this descriptive specification and forming an integral part thereof, some figures are attached in which the object of the invention has been represented by way of illustration and non-limiting.

DESCRIPTION OF VARIOUS EXAMPLES OF EMBODIMENT OF THE INVENTION

Given below is a description of various examples of embodiment of the invention, with reference to the numbering adopted in the figures.

Theoretically, it is possible to use the property that the transmission medium is made up of multiple conductors in order to successfully maximize the performance of a communications system using that transmission medium. In fact, it is possible to achieve a method that distributes the voltages in a multi-conductor medium in such a way that the signals are injected orthogonally into that medium, with which a lower level of interference among injections, greater coverage, etc., are achieved.

The main problem of these methods is the injection of the signals in the multi-conductor medium. The inventive device is capable of carrying out that injection in voltage optimally in order to follow the desired method for increasing the communication capacities of a system which uses that multi-conductor medium.

Figure 1:
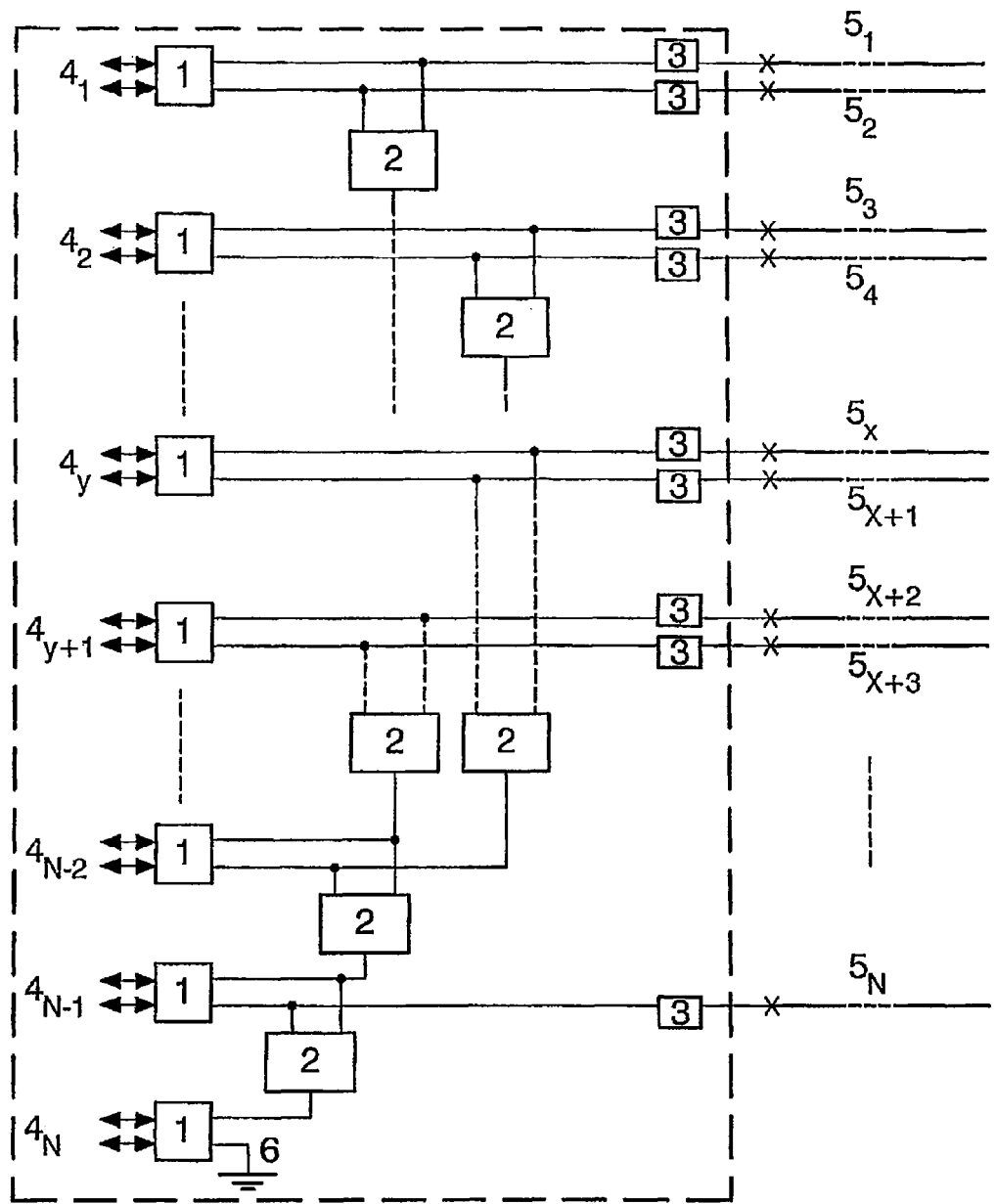
FIG. 1.—Shows an example of the multi-injection device with N signals on N conductors with their different elements and connections.

FIG. 1 shows an example of embodiment of a multi-injection device in voltage on N conductors ($5_1$ to $5_N$) and in which their elements and connections can be seen. In this figure there exist N input signals ($4_1$ to $4_N$) which are connected to the transformers (1). Depending on the mode to use for injecting the signal, the output from the transformers (1) can be connected to the conditioners (3), to differential mode chokes (2) or to both. Although in this example all the signals are used, it is possible to inject fewer than N signals (4) with which the number of injections would be less than N; or it is even possible not to use all the conductors (5) for injecting, with which all that would be needed is as many conditioners (3) as there are conductors on which signal is going to be injected.

Likewise, in this example of embodiment shown in FIG. 1 the last signal source ($4_N$) is injected in common mode, for which the connection of the secondary winding of the transformer (1) of the signal N is connected at one of its ends to the reference plane (6).

The specific configuration of the transformers (1), differential mode chokes (2) and conditioners (3) will depend on the specific application of the inventive device, and mainly on the multi-conductor transmission medium used.

Figure 2:
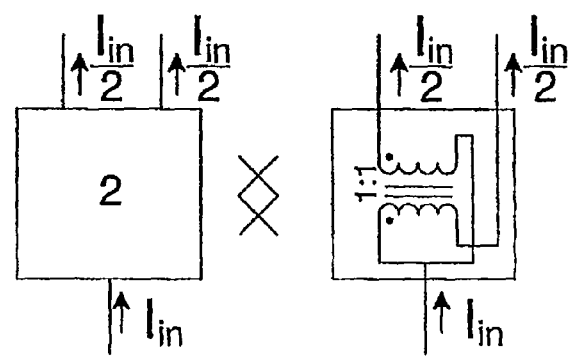
FIG. 2.—Represents a first form of implementing the differential mode choke of the device.

There exist several ways of implementing the differential mode choke: either separately or including it in a transformer. FIG. 2 shows a way of implementing a differential mode choke (2) separately by means of a transformer with a transformation ratio of 1:1. The choke blocks the differential mode which could enter through its outputs and allows the common mode of its input current ($I_{in}$) to pass to its two outputs, dividing the input current into half for each of the outputs ($I_{in}/2$).

Figure 3:
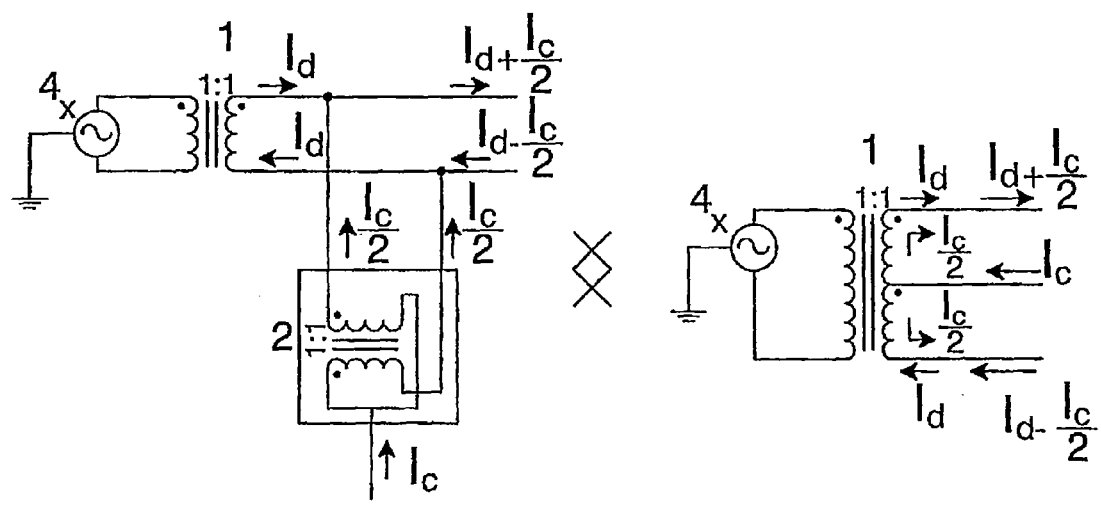
FIG. 3.—Represents a second form of implementing the differential mode choke, including it in the input transformer.

Moreover, FIG. 3 shows another way of implementing a differential choke (2) by means of the inclusion of the device in the input transformer (1). To achieve this, the intermediate connection of the secondary winding of the transformer (1) is used. In order to check the equivalence between the currents, the differential mode currents ($I_d$) and the common mode currents ($I_c$) are indicated separately.

Figure 4:
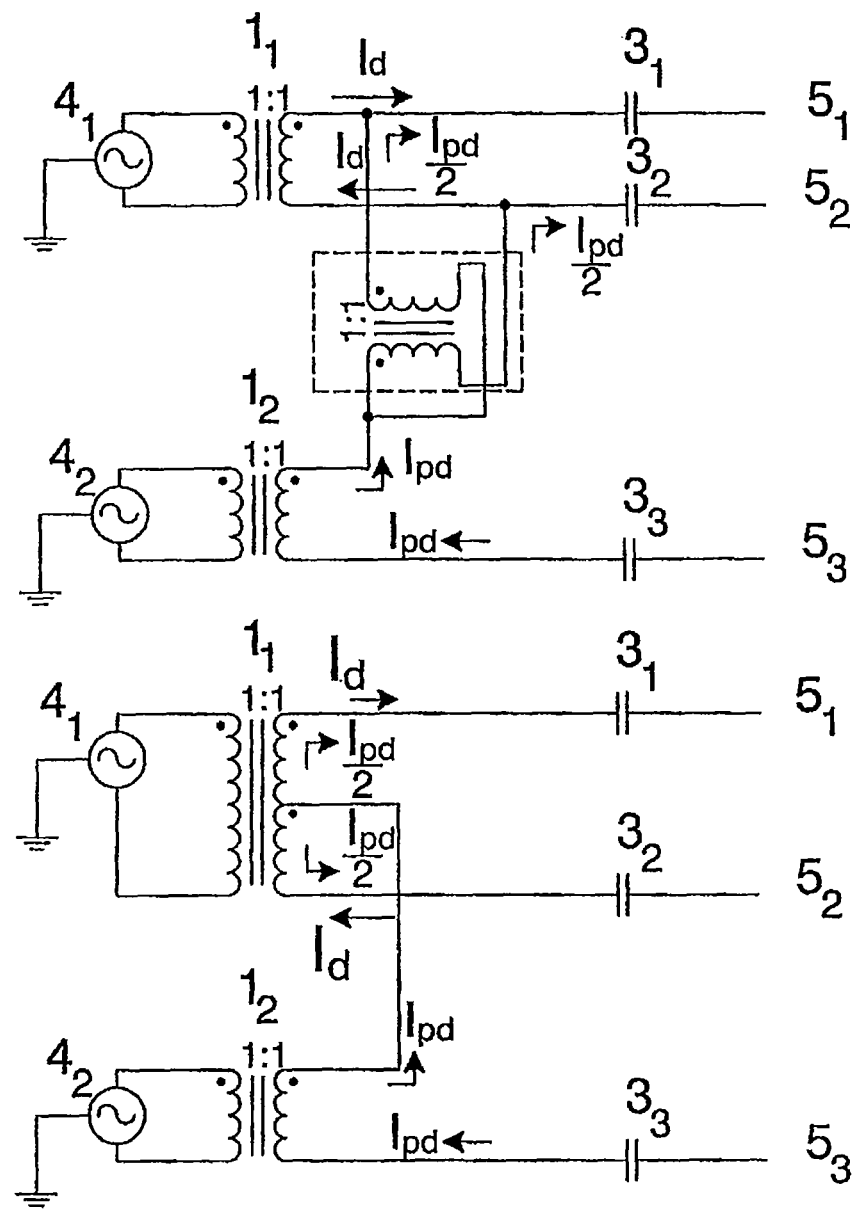
FIG. 4.—Shows the equivalence of both forms of implementing the differential mode choke of FIGS. 2 and 3, in accordance with the distribution of currents in the injection.

Both ways of embodying the differential choke are equivalent in any implement of the inventive device. Shown in FIG. 4 is an example in which there are two signal inputs ($4_1$ and $4_2$) which are differential inputs, there is a transformer for each input and ($1_1$ and $1_2$), the medium is made up of three conductors ($5_1$, $5_2$ and $5_3$) and the couplers ($3_1$, $3_2$ and $3_3$) associated with each conductor are simple capacitors. The upper part of the figure shows the embodiment with a differential choke (2) separated from the transformer in order to carry out the multi-injection of the signals, while the lower part shows the embodiment with the differential choke included in the transformer of the first input signal ($1_1$) in accordance with that represented in FIG. 3. The comparison of both cases enables it to be confirmed that the distribution of signals is equivalent after the injection has been carried out. In this example, the differential currents ($I_d$) are indicated as are the pseudo-differential currents ($I_N$).

Figure 5:
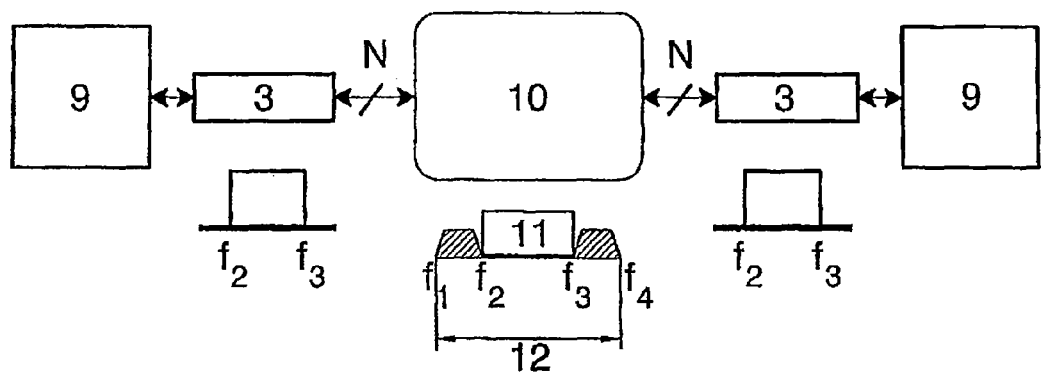
FIG. 5.—Represents an example in which the conditioners are band pass filters for suitably coexisting with the signals of the channel.

The conditioners used in the inventive device can be implemented, among other ways, as generic filters or as capacitors (acting as high pass filters). Thanks to this, it is possible to coexist with signals pre-existing in the communication medium without interference. In FIG. 5 the communication medium (10) has a defined bandwidth (12) from f1 to f4 but just part of this is free (11) since there exist signals occupying the spectrum from f1 to f2 and from f3 to f4. This part of the spectrum will be filtered by the conditioners in the circuit of the invention. In this figure part of the device (9) prior to the conditioner is connected to the conditioner (3), which consists of a band pass filter between the frequencies f2 and f3, which coincide with the ends of the free spectrum in the channel (11), permitting the injection without interference with the prior signals of the channel.

Figure 6:
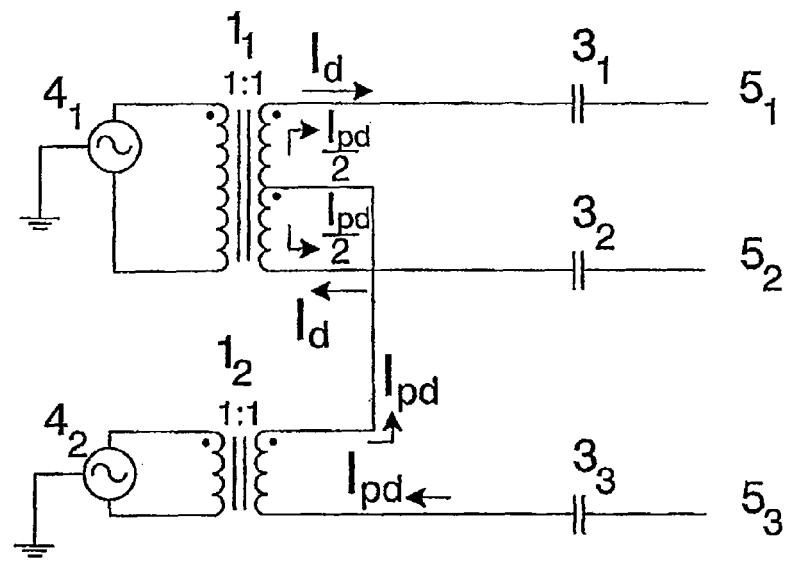
FIG. 6.—Shows the device for the specific case of injection of an electric network with phase, ground and neutral.

The inventive device can be used in any multi-conductor medium, for example the electrical network. This specific embodiment on the electrical network is shown in FIG. 6 where there are three conductors corresponding to phase ($5_1$,), neutral ($5_2$) and ground ($5_3$), where said ground conductor ($5_3$) is connected to the reference plane at an electrically remote point for the frequencies used in the communication, therefore said conductor is considered as a different conductor to the reference plane. In that figure the transformer of the first input ($1_1$) with intermediate connection in the secondary is VAC K24940, the transformer of the second input ($1_2$) is the Pulse PE68629, and the conditioners ($3_1$ and $3_2$) consist of coupling capacitors Murata DE1E3KX472MA5B 4N7, X1Y1, 20%. In this way the capacitors block the 50/60 Hz signal of the electric network and it is possible to carry out two orthogonal injections, one of differential mode between phase and neutral (signal $4_1$) and the other of pseudo-differential mode between phase-neutral and ground (signal $4_2$).

Figure 7:
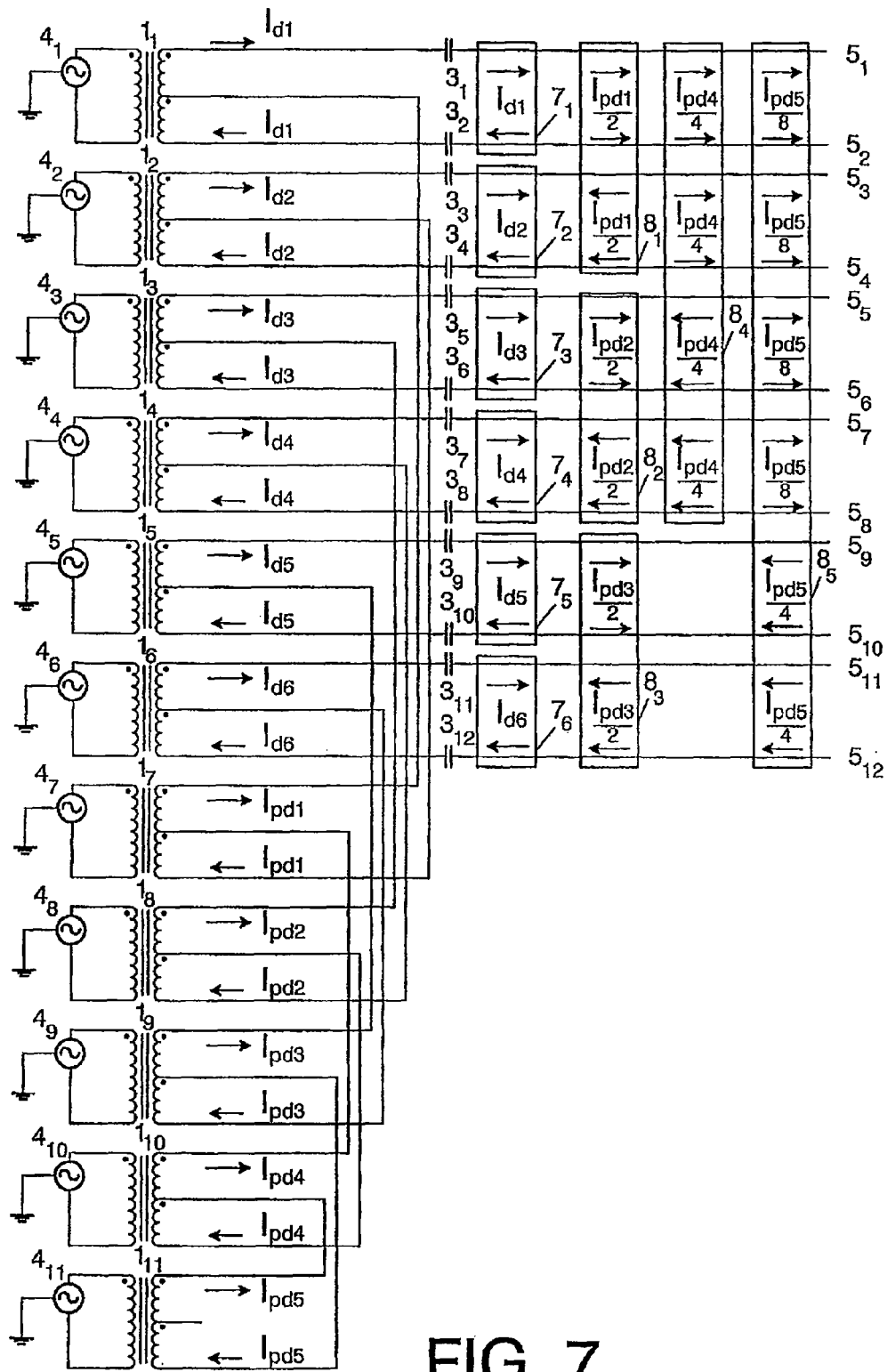
FIG. 7.—Shows the device for the case of having twelve conductors and using just differential and pseudo-differential injections among them.

The device can be used for any number of conductors. A specific example of embodiment with twelve conductors in shown in FIG. 7. In this example, injections are carried out solely in differential and pseudo-differential mode (marking the differentials as $7_1$ to $7_6$ and the pseudo-differentials as $8_1$ to $8_5$), and therefore there are just eleven signal inputs. The eleven inputs ($4_1$ to $4_{11}$) are connected to their transformers ($1_1$ to $1_{11}$) and these in turn are connected to other transformers (1) or to the conditioners (3) in an appropriate manner for ensuring the orthogonality of the injections according to the method for increasing the performance of the communications system that is used. As occurred in other embodiments, each one of the conductors ($5_1$ to $5_{12}$) will have a conditioner ($3_1$ to $3_{12}$) associated with it in order to inject signal into that specific conductor.

What is claimed is:

1. A device configured to inject a plurality of signals onto a medium made up of (i) N conductors and (ii) a reference plane, the device comprising:
    E signal inputs, wherein E is between 1 and N, and wherein each of the E signal inputs is configured to respectively receive one of the plurality of signals to be injected onto the N conductors of the medium;
    E signal transformers configured to receive the plurality of signals from the E signal inputs, wherein the E signal transformers are configured to inject the plurality of signals by means of orthogonal modes between different conductors of the N conductors; and
    C differential mode chokes, wherein C is between 1 and E depending on a number of non-differential modes used, wherein, for each differential mode choke of the C differential mode chokes,
        the differential mode choke includes one input and two outputs,
        the input is connected to either (i) one end of a secondary winding of one of the E signal transformers, or (ii) one of the outputs of another one of the C differential mode chokes, and
        the two outputs are connected to either (i) the inputs of two others of the C differential mode chokes, (ii) the input of another one of the C differential mode chokes and a conditioner of one of the conductors, or (iii) conditioners of two of the conductors,
    wherein the injections that use the C differential mode chokes are injections selected from between (i) pseudo-differential injections, (ii) injection in common mode, or (iii) a combination of pseudo-differential injections and injection in common mode.

2. The device of claim 1, wherein the device includes A conditioners, wherein A is between E+1 and N depending on the number N of conductors used in the medium, and wherein each conditioner of the A conditioners is located between (i) one of the N conductors, and (ii) either
    one of the ends of the secondary winding of one of the E signal transformers,
    one of the outputs of one of the C differential mode chokes, or
    a combination of the one of the ends of the secondary winding of one of the E signal transformers and the one of the outputs of one of the C differential mode chokes.

3. The device of claim 2, wherein the A conditioners are filters, and wherein the filters permit the co-existence of the plurality of signals injected onto the medium with other signals present in the medium.

4. The device of claim 3, wherein the filters used as conditioners include capacitors.

5. The device of claim 1, wherein each of the E signal transformers includes at least one primary winding and one secondary winding, wherein the primary winding is connected to the E signal inputs, and wherein the ends of the secondary winding are selectively connected to either:
    two conditioners,
    one conditioner and one of the C differential mode chokes,
    two of the C differential mode chokes, or
    the reference plane and one of the C differential mode chokes.

6. The device of claim 5, wherein at least one of the C differential mode chokes is implemented by including the least one of the C differential mode chokes in at least one of the E signal transformers respectively, wherein:
- an input of the at least one of the C differential mode chokes corresponds to an intermediate connection of the secondary winding of the E signal transformer; and
- outputs of the at least one of the C differential mode chokes corresponds to the ends of the secondary winding.

7. The device of claim 1, wherein the medium made up of the N conductors and the reference plane is an electrical distribution grid.

* * * * *